Jan. 20, 1970     L. T. RAMAIKA     3,491,009
ODOR REDUCTION IN LOW DENSITY MEDIUM IMPACT POLYSTYRENE FOAM
Filed Sept. 25, 1967
Fig. 1
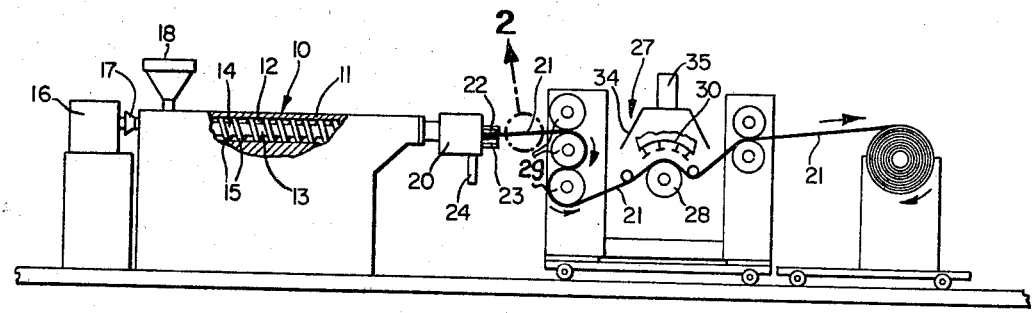
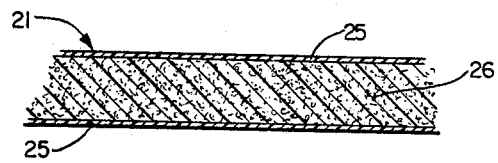
Fig. 2
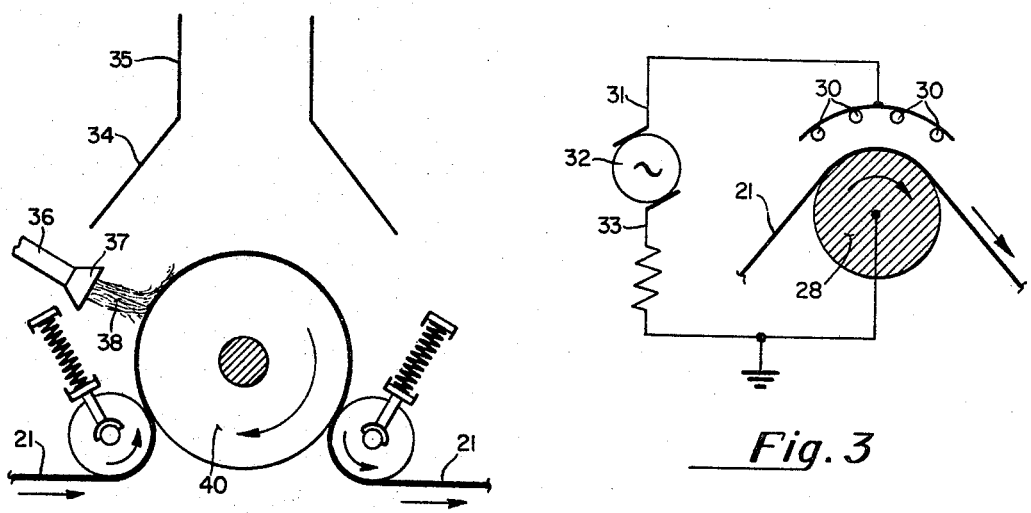
Fig. 4
Fig. 3
INVENTOR.
LAWRENCE T. RAMAIKA
BY
ATTORNEY.

United States Patent Office 3,491,009
Patented Jan. 20, 1970

3,491,009
ODOR REDUCTION IN LOW DENSITY MEDIUM IMPACT POLYSTYRENE FOAM
Lawrence T. Ramaika, Media, Pa., assignor to Scott Paper Company, Philadelphia, Pa., a corporation of Pennsylvania
Filed Sept. 25, 1967, Ser. No. 670,366
Int. Cl. B01k 1/00
U.S. Cl. 204—165     3 Claims

ABSTRACT OF THE DISCLOSURE

A method and apparatus are disclosed for reducing or eliminating the odor emitted from low density medium impact polystyrene resin foams, for example, polystyrene foams containing a butadiene component, to enable their use in plastic articles such as containers. The use of both an open flame and a corona discharge for deactivating odor-causing constituents in such resin foams is disclosed. Chief utility of the invention lies in the treatment of such foams in the form of a sheet having a substantially continuous, impervious, nonporous, integral skin on each surface thereof, and an internal core which comprises the major portion of the thickness of the sheet, which core has undergone further expansion due to foaming after formation of the skins.

BACKGROUND OF THE INVENTION

Field of the invention

The present invention relates to the formation of low density medium impact polystyrene foam which emits little or no objectionable odor, and, more specifically, to a method and apparatus for treating such foam to render inactive the odor-causing constituents entrapped therein during the foaming process, and to the articles foamed thereby.

Description of the prior art

In the past, medium impact polystyrene resin has been foamed in an extruder and expressed from an extrusion die in the form of a sheet. The foam sheet was often used in the production of articles such as containers which are formed by one of a variety of methods involving the application of differential pressure to the foam sheet to press it into conformity with a molding surface. The term "medium impact polystyrene" as used throughout this specification and the appended claims means polystyrene resin containing a butadiene component, either physically intermixed therewith or present in the form of a copolymer with the styrene. It is well known that such material possesses improved physical characteristics, such as increased flexibility without cracking, which enhance its value for many uses. With foam sheet forming methods employed in the prior art, any odor-causing constituents present in the impact polystyrene resin material or formed during the foaming operation were generally released from the foam to a large extent upon its emergence from the extrusion die in the form of a sheet. Therefore, articles formed from the sheet normally did not possess or emit an objectionable odor.

However, recent attempts to lower the density of the foam sheet, as by entrapping the foaming gases within the sheet at an early stage in its formation, so as to allow further expansion of the sheet at least in its core after it has emerged from the extrusion die, have resulted in the formation and retention of odor-causing constituents in the foam sheet. For example, one method for lowering the density of the foam sheet involves cooling the surfaces of the sheet as it emerges from the extrusion die so as to form a substantially continuous, impervious, non-porous, integral skin thereon, such cooling being insufficient to prevent further foaming and resulting expansion of the core of the sheet. The above process has been employed satisfactorily with polystyrene resin materials of a relatively pure composition; that is, no odor appears to be emitted from the resulting foam sheet or article formed therefrom. However, when the above-described process is employed with medium impact polystyrene resin materials, objectionable odor-causing constituents become entrapped in the foam sheet and are emitted during its subsequent use, being especially noticeable and objectionable when the sheet is formed into a plastic article such as a container and used to hold hot liquids or beverages.

Prior attempts to remove odor from plastic materials in general, including medium impact polystyrene foam materials, have generally consisted of the addition of some fragrant material either during compounding or after foaming to mask any objectionable odor present. In the case of containers such as drinking cups, the use of masking agents is unsatisfactory as the fragrant odor may be disagreeable to the user.

BRIEF SUMMARY OF THE INVENTION

In the method of the invention, foamable medium impact polystyrene resin material is extruded through an extrusion die in the form of a sheet under conditions which cause the material in the sheet to undergo expansion into a foam. When this is done, it has been found that odor-causing constituents are formed in the medium impact polystyrene resin material. Each surface of the sheet is then cooled as it emerges from the extrusion die to form a substantially continuous, impervious, nonporous, integral skin thereon. The cooling is insufficient to prevent further expansion of the core of the sheet which comprises the major portion of the thickness of the sheet. In the course of the above, odor-causing constituents are entrapped within the foam sheet and between the skins. Complete expansion of the foamable medium impact polystyrene resin material in the core of the sheet is permitted after which at least one of the surfaces of the sheet is treated to deactivate odor-causing constituents therein.

In one embodiment of the method of the invention at least one of the surfaces of the sheet is contacted with a corona discharge to deactivate odor-causing constituents therein. In another embodiment of the method of the invention, at least one of the surfaces of the sheet is contacted with an open flame to deactivate odor-causing constituents therein. Some embodiments of the method of the invention include the formation of articles such as containers from a sheet of low density medium impact polystyrene foam which has been formed and treated in accordance with the above-described method.

Products of the invention involve both sheets of low density medium impact polystyrene foam formed by the above-described method of the invention, and containers or other articles made from such sheets.

Apparatus of the invention includes extrusion means for conditioning foamable medium impact polystyrene resin material so as to commence foaming of the resin material. As mentioned above, this conditioning has been found to result in the formation of odor-causing constituents in the resin material. The extrusion means include an extrusion die for receiving the resin material and for extruding it in the form of a sheet prior to completion of the foaming. The extrusion die has two lips through which the sheet passes. Cooling means are disposed adjacent each of the lips and are adapted to cool each surface of the sheet as it emerges from the extrusion die. This results in the formation of a substantially continuous, impervious, nonporous, integral skin thereon but does not prevent further expansion of the core of the sheet, which core comprises the major portion of the thickness of the sheet. The odor-causing constituents are thus entrapped within the foam sheet and between the skin. Deactivation means are spaced from the extrusion die for a distance sufficient to allow substantially complete expansion of the foamable impact polystyrene resin material in the core of the sheet before deodorizing treatment. The deactivation means are arranged to treat at least one surface of the sheet so as to deactivate odor-causing constituents in the foam sheet. One embodiment of the invention employs, as deactivation means, a corona discharge means arranged to pass a high voltage through the sheet. Another embodiment of the apparatus of the invention includes a means for contacting at least one surface of the sheet with an open flame to deactivate the odor-causing constituents therein.

BRIEF DESCRIPTION OF THE DRAWINGS

FIGURE 1 is a schematic side elevation view of apparatus for forming a sheet of low density medium impact polystyrene resin foam in accordance with the present invention, FIGURE 2 is a greatly enlarged sectional view of the sheet 21 formed in FIGURE 1 before treatment thereof in accordance with the invention, FIGURE 3 is a schematic diagram of the deactivation means 27 shown in FIGURE 1, and FIGURE 4 is an enlarged schematic side elevation view of a modified embodiment of a portion of the apparatus shown in FIGURE 1.

DESCRIPTION OF THE PREFERRED EMBODIMENTS

Referring to FIGURE 1, extrusion means are shown including a rotary screw extruder 10 comprising a housing 11 having a cylindrical barrel 12 in which an extruder screw 13 is rotatably mounted. The screw 13 contains one or more helical grooves 14 disposed between and defined by one or more helical lands or ribs 15, lands 15 and grooves 14 extending along the length of screw 13. The screw 13 is rotatably driven by a drive means such as a motor 16 operating through a drive mechanism 17. Material is fed into the extruder barrel 12 through a hopper 18 and is conveyed along the barrel 12 by the rotative movement of the screw 13. Plastic resin material fed into the extruder 10 is conditioned under heat and pressure so that it is melted and thoroughly mixed. Upon addition of a blowing agent to the plastic resin material, either by initially compounding or mixing the blowing agent with the resin or by injecting the blowing agent through tthe extruder housing 11 into the barrel 12 at a point intermediate the length of the barrel 12, the melted and mixed resin material is rendered foamable and is caused to foam upon release of pressure. An extrusion die 20 is provided at the outlet end of the extruder 10 and is arranged to receive the plastic resin material under pressure from the extruder 10 and to form it into the desired shape such as the sheet 21 which is shown in cross-section in FIGURE 1.

Two cooled lips 22 and 23 between which the sheet passes are disposed at the end of the extruder die. The cooled lips 22 and 23 preferably are water cooled or oil cooled, as by the circulation of water or oil through them, which water or oil is fed through duct 24, and are arranged to withdraw a large amount of heat rapidly from the moving, partially foamed sheet material 21 passing between them so as to form a skin 25 on each major surface of the sheet material 21 as shown in FIGURE 2.

The sheet 21 which issues from between the two lips 22 and 23 has a central core 26 of foamable plastic resin material capable of further expansion. The core 26 comprises the major portion of the thickness of the total sheet 21 and generally greater than 80% of the thickness of the sheet 21. The core 26 is bounded on each surface thereof by a substantially continuous, impervious, non-porous integral skin 25 formed by the rapid cooling of the foamable resin material passing between the two lips 22 and 23. The skins 25 retain the foaming gases and other products created during extrusion in the interior of the foam sheet, that is, chiefly in the core 26 but also to some extent in the skins 25 themselves. However, the skins 25 are free to move relatively away from one another in response to subsequent expansion of the core 25 of the sheet.

The sheet 21 is fed over a plurality of polished sheet rolls 29 in a roll stack which serves to cool the foamed sheet. The rolls 29 also serve to insulate the sheet emerging from the extrusion die 20 from tension created in subsequent portions of the apparatus of the invention.

The apparatus shown in FIGURE 1 includes one embodiment of deactivation means 27 of the invention capable of treating at least one surface of the sheet 21 so as to deactivate odor-causing constituents within sheet 21. The deactivation means 27 are spaced from the cooled lips 22 and 23 of the extrusion die 20 for a distance sufficient to allow substantially complete expansion of the foamable resin material in the core 26 of the sheet 21.

In the embodiment shown in FIGURE 1, and in greater detail in FIGURE 3, sheet 21 passes over a grounded roll 28 which is made of electricaly conductive material, preferably steel covered with a dielectric material such as a polyester film or rubber. One or more electrodes 30 are disposed generally above the sheet 21 which contacts the roll 28. The electrodes 30 are spaced from the roll 28 and the sheet 21 by an air gap or clearance. A hood 34 is generally disposed adjacent roll 28 and above the portion of sheet 21 being treated with a corona discharge. Hood 34 is connected to a duct 35 leading to a fan (not shown) adapted to draw odorous gases released by the foam sheet 21 away from the treatment area. The electrodes 30 are connected to the output terminal 31 of a high voltage generator 32, the opposite terminal 33 of which is grounded. The high voltage differential created between the electrode 30 and the grounded roll 28 causes a high voltage to jump the air gap between the electrode 30 and the roll 28 resulting in corona discharge and the generation of ozone gas.

The electrode 30 is generally maintained at a distance of from about 1/32 inch to about 1/4 inch from the nearest surface of the sheet 21 being treated at a voltage level of about 1.5 kva. and satisfactory results were obtained with this arrangement in the treatment of a foam material having a thickness of from about 0.050 to about 0.100 inch. However, this air gap, as well as the voltages applied, may vary considerably as may the thickness of the foam sheet 21 being treated and, within relatively wide limits well-known to those familiar with corona discharge treating phenomena, are not critical to the method of the invention or to the construction and operation of apparatus of the invention.

FIGURE 4 illustrates an alternative form of deactivating means 27 for treating at least one surface of the sheet 21 to deactivate odor-causing constituents therein. A combustible gas such as methane, propane or butane is fed through a duct 36 into a burner 37 which, when the gas is ignited, emits a flame 38 directed toward one surface of the sheet 21 and in contact therewith while the sheet 21 passes over a support roll 40. As in the emobdiment shown in FIGURE 1, a hood 34 is preferably employed to remove odorous gases from the treatment area. It is preferable that the sheet 21 be supported on a roll 40 which is heat-conductive and capable of preventing melting or burning of the plastic resin material. However, if the foam sheet 21 is moved at a sufficiently high rate, no heat-conductive backing or support roll 40 is required and sufficient flame exposure is possible to deactivate odor-causing constituents in the foam sheet 21.

Foam sheet manufactured and treated in accordance with either of the above-described processes may be formed by any one of a variety of methods into a container such as a hot cup in which its insulating qualities are utilized. Generally, such methods of formation involve the use of differential pressure, sometimes in cooperation with mechanical force, to press the foam sheet into contact with a molding surface. For example, various vacuum forming methods may be employed in a manner well-known to those skilled in the art.

Products of the invention comprise both foam sheet materials and containers made of such foam sheet materials which possess the improved characteristics of strength and flexibility chiefly attributable to impact polystyrene resin materials while being substantially free from objectionable odor due to odor-causing constituents in the foam sheet even when the sheeting has a relatively low density, that is, on the order of 30 lbs./cu. ft. or less. The invention is most advantageous in the formation of extremely low density foams, that is, on the order of from about 5 lbs./cu. ft. to about 20 lbs./cu. ft. Foam sheet of the invention is characterized by a glazed skin 25 on each of its major exterior surfaces which is relatively thin, perhaps on the order of from about .0005 inch to about .010 inch, although these limits are not critical and can vary widely depending upon the over-all thickness of the foam sheet and its intended use. The skin 25 on the foam is generally substantially continuous over the entire surfaces of the sheet contacted by the lips 22 and 23 of the extrusion die 20. The skin 25 is generally integral with the sheet, that is, it is formed from the same material as the core 26 of the sheet 21 and any line of demarcation exists only by differences in the relative density of material in the core 26 compared to the material in the skin 25 resulting from both rapid cooling before completion of foaming and smearing of the material on the sheet surfaces by the lips 22 and 23 of the extrusion die 20 which seals the surfaces and makes them nonporous and impervious to liquids as well as to the foaming gases contained within the foam.

The nature of the odor-causing constituents in foam sheet formed according to the invention is not clearly understood. Furthermore, the manner in which such odor-causing constituents are deactivated is not clearly understood. It is known that a greater amount of objectionable odor is emitted from foam sheet formed from resin material which is subjected to a higher temperature during extrusion and sheet formation. Objectionable odors have been experienced with foams formed from medium impact polystyrene offered commercially from a large number of manufacturers and in a variety of types and grades. It is believed that odor-causing constituents are formed from a breakdown or oxidation of the butadiene component, perhaps in combination with the styrene monomer. The odor detected resembles to some degree the odor characteristic of benzaldehyde which is generally a product of styrene oxidation. Small amounts of odor-causing material are quite objectionable.

It is further believed that the odor-causing constituents are oxidized by the process of deactivation in accordance with the invention into components or constituents which have no odor. For example, if the odor-causing content is benzaldehyde, upon exposure to an open flame, and more preferably to a corona discharge, it is transformed into benzoic acid which has no objectionable odor. However, other theories of deactivation must also be considered; for example, local heat generated by the flame treatment or the corona discharge may cause vaporization of the odor-causing constituents. In addition, either of the above treatments might result in penetration of the cells of the foam, thereby allowing the release of odor-causing constituents therein, the expansion or vaporization of which is prompted by the concomitant heat.

Regardless of the theory behind the success of the method and apparatus of the invention, it has been clearly established by extensive tests that foamable medium impact polystyrene resin materials formed in accordance with the above-described method into a foam sheet of relatively low density having an inner core and outer skins thereon possess a strong objectionable odor when untreated. However, after treatment in accordance with the invention such foam sheets possess only a slight unobjectionable odor, at most, and, generally, substantially all traces of objectionable odor are noticeably absent. Both treated and untreated samples of such materials were repeatedly subjected to testing and analysis by a committee of individuals experienced in odor detection and the above results were repeatedly obtained with reliable consistency.

From the above description, it will be apparent that numerous changes and modifications may be made in the invention without departing from the spirit and scope thereof. For example, a liner of paper or plastic may be laminated to the foam material either before or after the treatment to deactivate odor-causing constituents therein, and the success of the invention is not impaired. That is, the method and apparatus may be used to treat the composite material, if desired. Furthermore, changes may be made in the apparatus described without losing any of the benefits of the invention; for example, an air knife could be used to cool one or both of the surfaces of the sheet 21, instead of using one or both of the lips 22 and 23, as shown in FIGURE 1 and described above. Therefore, the invention is not intended to be limited to the specific details described herein.

What is claimed is:

1. A method for forming a sheet of low density medium impact polystyrene foam, comprising:

extruding foamable medium impact polystyrene resin material through an extrusion die in the form of a sheet under conditions which cause the material in said sheet to undergo expansion into a foam, whereby odor-causing constituents are formed in said resin material, cooling each surface of said sheet as it emerges from said extrusion die to form a substantially continuous, impervious, nonporous integral skin thereon, said cooling being insufficient to prevent further expansion of the core of said sheet, which core comprises the major portion of the thickness of said sheet, whereby odor-causing constituents are entrapped within said foam sheet and between said skins, allowing complete expansion of the foamable medium impact polystyrene resin material in the core of said sheet, and treating by contacting at least one of the surfaces of said sheet with a corona discharge to deactivate odor-causing constituents therein.

2. A method according to claim 1, wherein said medium impact polystyrene resin material includes a polystyrene-butadiene copolymer.

3. A method according to claim 1, including forming said sheet of low density medium impact polystyrene foam into a container after treatment thereof to deactivate the odor-causing constituents therein.

References Cited

UNITED STATES PATENTS

| 2,862,862 | 12/1958 | Charlesby et al. | 264—22 |
| 3,333,032 | 7/1967 | Dickinson | 264—22 |

FOREIGN PATENTS

| 12,525 | 12/1905 | Great Britain. | |

ROBERT K. MIHALEK, Primary Examiner

U.S. Cl. X.R.

204—312; 264—22, 80; 250—49.5